United States Patent [11] 3,547,335

[72] Inventor Alain Edouard Plegat
 Asnieres, France
[21] Appl. No. 713,466
[22] Filed March 15, 1968
[45] Patented Dec. 15, 1970
[73] Assignee Societe Anonyme Des Usines Chausson
 Hauts-de-Seine, France
 a company of France
[32] Priority April 28, 1967
[33] France
[31] No. 104,657

[54] EQUIPMENT FOR BRAZING LIGHT METAL RADIATORS
 9 Claims, 5 Drawing Figs.
[52] U.S. Cl. .................................................. 228/44,
 228/33, 228/39, 228/40; 269/46, 269/73
[51] Int. Cl. .................................................. B23k 19/00
[50] Field of Search .......................................... 228/33, 36,
 39, 40, 44; 269/46, 43

[56] References Cited
UNITED STATES PATENTS
1,921,489 8/1933 Stein ............................. 269/73
1,301,793 4/1919 Spery ........................... 228/39

Primary Examiner—John F. Campbell
Assistant Examiner—Robert J. Craig
Attorney—Imirie and Smiley ABSTRACT: The equipment for brazing light metal radiators comprises several mounts of a general rectangular frame shape of which one side is removable, each mount containing at least one radiator and being provided with a transversal spindle ensuring the suspension in a cradle, said cradle comprising bolts and stops for holding the mounts in two distinct positions successively occupied by said mounts, firstly during the brazing operation by dipping, then during the operation of withdrawal from the brazing bath.

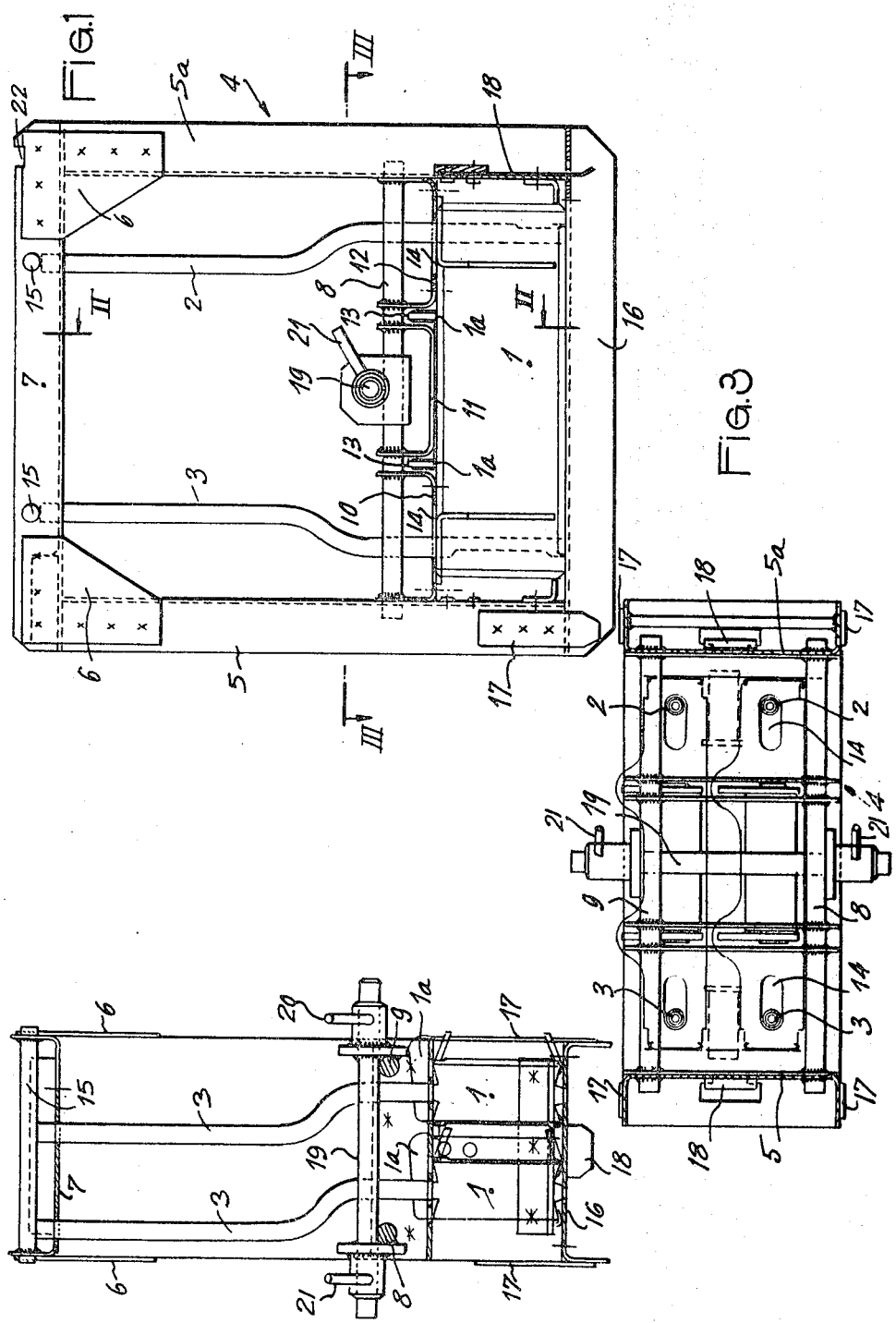

PATENTED DEC 15 1970

INVENTOR
ALAIN E. PLEGAT
Imrie & Smiley
ATTYS.

EQUIPMENT FOR BRAZING LIGHT METAL RADIATORS

The present invention relates to a new equipment for brazing light metal radiators by the process called "flux bath," i.e., dipping the radiators completely in a molten salt bath forming a flux for the brazing alloy covering at least certain parts of the parts of which radiators are made up.

It is essential for doing the brazing properly that the flux should reach all the parts of the radiator to be brazed, but it is also essential that the flux can be drained off when the radiator is removed from the bath, and specifically, that the flux that has penetrated into the cavities of the radiator can be evacuated.

To enable brazing operations to be economically carried out, especially for small sized radiators, like oil radiators for motor vehicles, it has seemed important that a relatively large number of radiators should be brazed simultaneously, thus limiting handling operations.

The present invention creates an equipment which fulfills all the conditions required for doing good quality brazing and in an economical manner of radiators, especially oil radiators for motor vehicles.

According to the invention, the equipment comprises mounts of a general rectangular frame shape, of which one side is removable, these mounts containing at least one radiator for brazing, and said mounts being each provided with a transversal spindle ensuring the suspension of the mount in a cradle containing several mounts, said cradle comprising bolts and stops for holding the mounts in two distinct positions successively occupied by said mounts, at first during the brazing operation by dipping, then during the withdrawal operation from the brazing bath.

Various other characteristics of the invention will moreover be revealed by the detailed description which follows.

One form of embodiment of the object of the invention is shown, by way of nonrestrictive example, in the attached drawing.

FIG. 1 is an elevation of one of the brazing tool equipment elements of the invention.

FIG. 2 is an elevation partly cut away along the line II–II of FIG. 1.

FIG. 3 is a section seen along the line III–III of FIG. 1.

Figure 4:
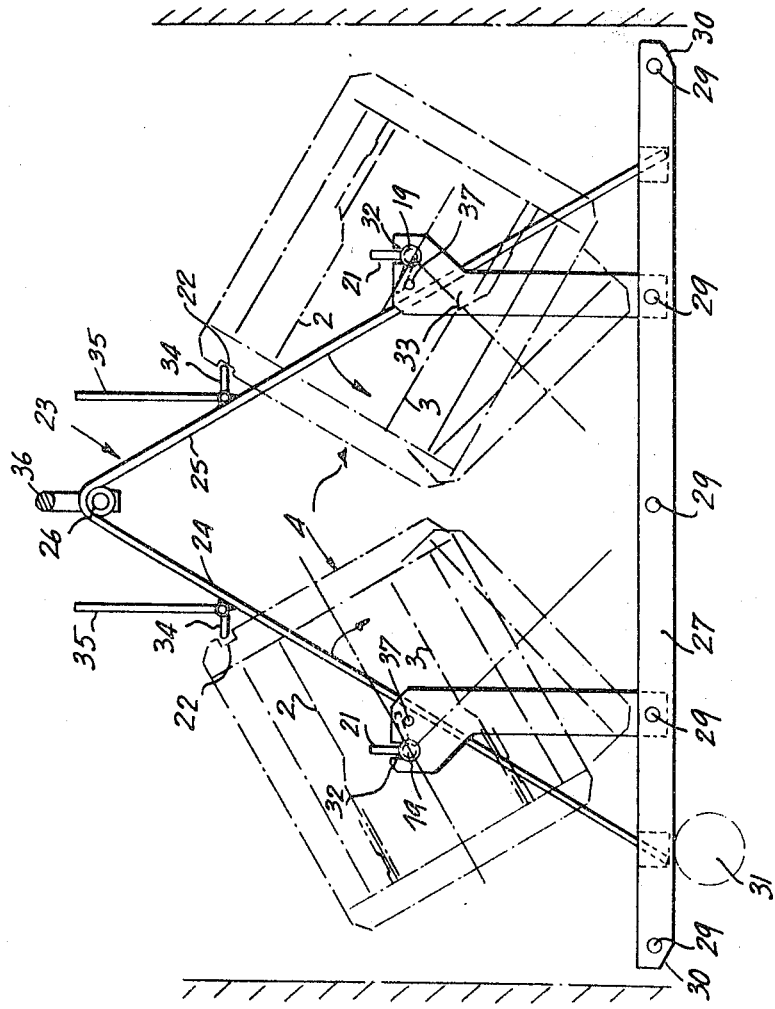
FIG. 4 is a diagrammatical elevation of the brazing tool assembly of the invention.

The equipment shown in the drawing is intended to enable simultaneous brazing in the flux bath of several identical exchangers comprising, as more particularly shown in FIGS. 1 and 2, each an exchange body 1 and inlet and outlet tubes 2, 3. These exchangers can be made in different manners, but in all cases, their constituent parts are made of light metal or alloy and these parts must be finally assembled by a simultaneous brazing, by plunging them into a molten flux bath.

The equipment firstly comprises mounts which are shown in FIGS. 1 to 3, these mounts designated on the whole by 4 having the shape of a rectangular frame having each one two lateral sides 5, 5a made of U-shaped sections joined by stayplates 6 to an upper side 7, also made of a U-shaped section. The lateral sides 5, 5a are connected by bars 8, 9 to which are fixed, as well as to the lateral sides 5, 5a, U-shaped iron fittings, 10, 11 and 12, confining passages 13 between them in which the projecting parts 1a are housed that the exchange bodies 1 of radiators have. The iron fittings 10 and 12 also have slots 14 for introducing inlet and outlet tubes 2, 3 of the radiators, the ends of the tubes bearing against abutments 15 connecting the U-shaped iron wings forming the top side 7 of the mounts, the U-shaped iron fitting being itself drilled so that the ends of the inlet and outlet tubes 2, 3 can pass through it.

As shown by the drawing, the iron fittings 10, 11 and 12 form bearing elements for the exchanger body 1 of radiators. For keeping radiators in position, each mount has a removable cover 16 made of a U-shaped iron fitting which is guided between the lugs 17 borne by the lateral sides 5, 5a. The cover 16 is integral with the frame by elastic bolts 18 so that the exchange bodies 1 are held against the cover 16 against the iron fittings 10, 11 and 12, without, however, resilient forces being applied to said exchange bodies, which avoids their being deformed when they are heated up to near to the temperature of the melting of the metal of which they are made, during the brazing operation in the bath.

The drawing shows that each frame can, for instance, hold two radiators. It is obvious that the frames could be made in a similar manner to hold one radiator, or on the contrary, to hold more than two radiators. The bars 8, 9 described in the foregoing are also used for the support of a transversal spindle 19 projecting on either side of the frame, as particularly shown in FIGS. 2 and 3. The spindle 19, is provided at its projecting ends, with abutments 20, 21, called "orientation," whose function appears in that which follows. Moreover, the top side 7 of each frame has a notch 22 whose function will also be explained hereafter.

Figure 5:
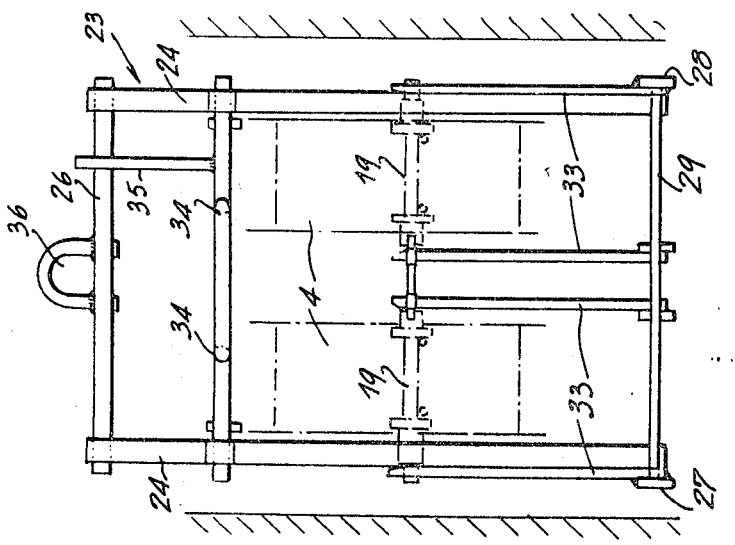
FIG. 5 is an elevation corresponding to FIG. 4 but turned for 90° in relation to it.

The above-mentioned frames forming holding mounts for the radiators to be brazed, are positioned, as shown in FIGS. 4 and 5, in a suspension cradle designated on the whole by 23 of a general isoceles triangular shape and comprising two groups of sloping uprights 24, 25 held together at their top, by a strut 26, and at their base by frame members 27, 28. The frame members 27, 28 are held together by crossbars 29.

As shown by the drawing, the ends of the frame members 27, 28 have beveled edges 30 so that these frame members form skids enabling the cradle 23, provided with its mounts 4, to travel on transfer runways, for instance, on rollers, as shown at 31. The drawing shows that the cradle 23 can, for example, hold four mounts 4, and consequently, eight radiators. The mounts 4 are supported by their respective spindles 19 engaged in the notches 32 of sideplates 33 fixed both to some of the crossbars 29, and possibly to the sloping sides 24, 25.

For holding the mounts 4 in the position where they are completely shown in FIG. 4, movable bolts 34, which can be controlled by levers 35, are engaged in the notches 22 of the top side 7 of each mount. Each cradle is provided, at its top part, with a suspension hook 36 enabling the cradle assembly to be lowered and raised when it must be plunged, then removed from the brazing bath.

Before the cradle is removed from the brazing bath, the levers 35 are operated for disengaging the bolts 34. The spindles 19 of the mounts not being arranged according to the center of gravity of said mounts, it follows that these mounts pivot around said spindles 19 to reach a position for which the inlet and outlet tubes 2, 3 of the radiators slope downwards. The pivoting movement of the mounts is limited by the stops 37 carried by the side-plates 33 and against which the orientation abutments 20, 21 bear, integral with the spindles 19 of the mounts.

During the raising of the cradle, the flux having ensured the brazing and which was contained inside the exchange bodies 1 and tubes 2, 3 can flow so that the radiators are properly drained at the end of brazing and before cooling.

For cooling the radiators after brazing, it is sufficient to withdraw the mounts 4 from the cradle 23 which can be immediately provided with new mounts. With regard to the subsequent withdrawal of the radiators, this can be easily done by taking off the cover 16 which is only held by resilient bolts 18.

The invention is not limited to the examples of embodiment shown and described in detail, for various modifications can be applied to it without going outside the scope of the appended claims and the reasonable equivalent thereof.

I claim:

1. Equipment for brazing radiators by dipping in melted flux comprising a plurality of metallic mounts each of which includes means for fixedly supporting at least one radiator thereon, each mount including support means offset with respect to the center of gravity thereof when a radiator is supported thereon, each mount including a stop means, a metallic cradle including a bottom frame, uprights extending upwardly from said frame, means for suspending the cradle in melted flux, said cradle having support members engaging and rotatably supporting the support means of each of said plurality of mounts, locking means supported by said uprights and engaging said stop means to retain the mounts and radiators supported thereby in fixed position on the cradle when being dipped in melted flux and allowing the mounts and the radiators supported thereby to be automatically rotated when withdrawn from the melted flux.

2. Equipment as defined in claim 1, wherein said cradle is generally of triangular configuration with a plurality of sloping uprights between which said mounts are suspended.

3. Equipment as defined in claim 1, wherein said bottom frame includes members forming skids for travel along transfer runways.

4. Equipment as defined in claim 1, wherein said support means of each of said mounts comprises a transverse spindle extending on opposite sides of the associated mount, said support members of the cradle comprising upwardly extending side plates having notches receiving said spindle whereby said mounts are rotatably and removably mounted on said cradle.

5. Equipment as defined in claim 1, wherein each of said mounts includes two lateral sides and an upper side rigidly connected between first ends of said lateral sides, lugs extending from the opposite ends of said lateral sides to form guides receiving a removable cover, elastic bolts supported by said lateral sides and engaging said removable cover, fittings carried by each of said mounts and extending substantially parallel with an associated removable cover whereby a radiator is adapted to be supported between said cover and said fitting and between said lateral sides in condition for brazing without elastic pressure being applied thereto.

6. Equipment as defined in claim 5, wherein said fittings have openings formed therethrough for receiving tubes connected to an associated radiator, said upper side of each mount having abutments for engaging such tubes whereby an associated radiator and tubes connected thereto are retained in proper position for brazing.

7. Equipment as defined in claim 1, wherein said locking means comprises a plurality of pivotally mounted bolts, each of said mounts having a notch for receiving one of said bolts.

8. Equipment as defined in claim 1, including second stop means on each of said mounts, said cradle having cooperating means for engaging each of said second stop means.

9. Equipment as defined in claim 8, wherein each of said second stop means on said mounts comprises abutments supported by and extending outwardly of the associated support means, the cooperating means on the cradle comprising stops engageable with said abutments.